Dec. 6, 1927.
L. E. LA BRIE
BRAKE
Filed April 2, 1927
1,651,608
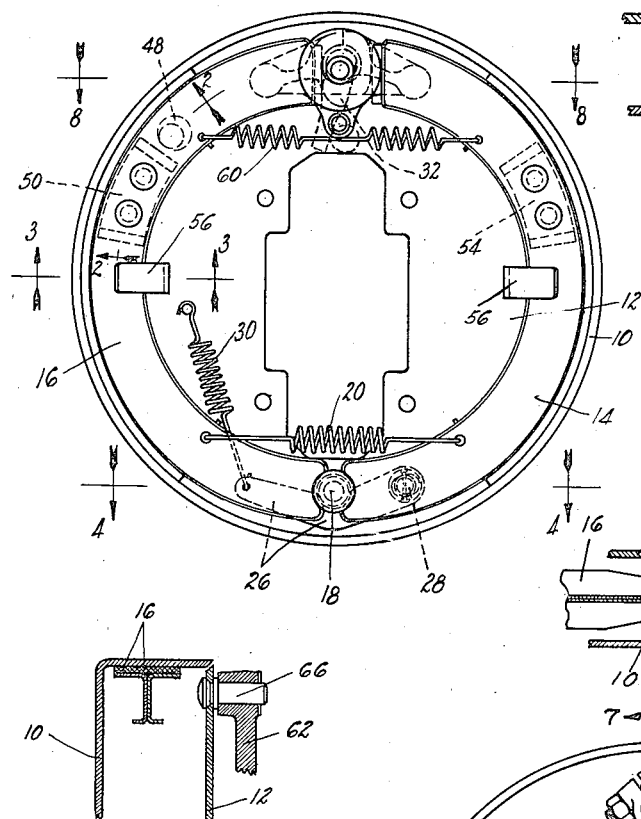
Fig.1.
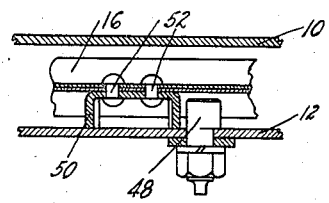
Fig.2
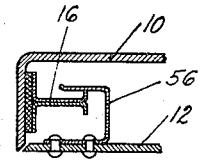
Fig.3
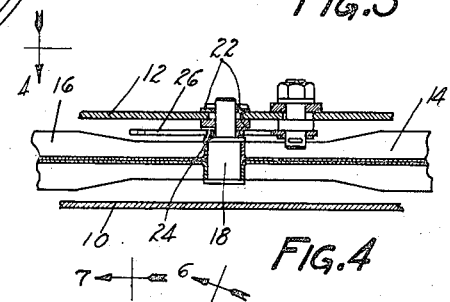
Fig.4
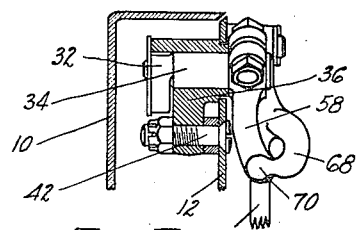
Fig.6
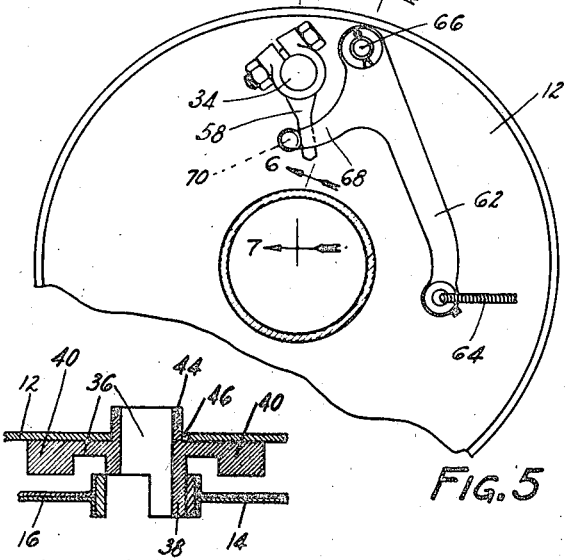
Fig.5
Fig.7
Fig.8
INVENTOR
LUDGER E. LA BRIE
BY
Jas. W. McConkey
ATTORNEY Patented Dec. 6, 1927.

1,651,608

UNITED STATES PATENT OFFICE.

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed April 2, 1927. Serial No. 180,449.

This invention relates to brakes, and is illustrated as embodied in an internal expanding automobile brake.

Various features of novelty relate to providing operating means for taking the braking torque when the drum is turning in one direction, in combination with separate means for taking the torque (preferably from a different shoe) when the drum is turning in the other direction; to providing the shoe with a novel channel-section steady rest engaging the backing plate, and which may advantageously be arranged to engage a stationary abutment or anchor to transmit the braking torque thereto; and to a novel double-lever arrangement included in the brake-applying mechanism.

The above and other objects and features of the invention, including various novel and desirable details of construction, will be apparent from the following description of the illustrative embodiment shown in the accompanying drawing, in which:

Figure 1 is a vertical section through the brake, just inside the head of the brake drum, and showing the brake shoes in side elevation;

Figure 2 is a partial section on the line 2—2 of Figure 1, showing one of the novel steady rests;

Figure 3 is a partial section on the line 3—3 of Figure 1, showing the means for holding the steady rest of Figure 2 against the backing plate of the brake;

Figure 4 is a partial section on the line 4—4 of Figure 1, showing the means for centering the shoes when the brake is released;

Figure 5 is a vertical section looking toward the backing plate of the brake, i. e. in the opposite direction from Figure 1, and showing part of the brake-applying means in side elevation;

Figure 6 is a partial section through the brake-applying means on the line 6—6 of Figure 5;

Figure 7 is a partial section through the brake-applying means on the line 7—7 of Figure 5; and Figure 8 is partial section on the line 8—8 of Figure 1, but with the cam and camshaft omitted.

The brake selected for illustration includes a rotatable drum 10, at the open side of which is a backing plate or other support 12, and within which are arranged shoes 14 and 16 connected by a floating pivot 18, against which the shoes are held by a spring 20. As best shown in Figure 6, each of the shoes may be built up of two L-section steel stampings secured back to back to provide a rigid double-thickness stiffening web.

Pivot 18 extends through a relatively large opening in the backing plate (see Figure 4) and has washers 22 engaging opposite sides of the plate. It is also provided with a roller 24 seated in a double-wedge depression formed in the edge of a narrow lever 26 pivoted at 28 on the backing plate and urged by a spring 30 in a direction to center the shoes 14 and 16 when the brake is released.

The brake is applied by means such as a one-lobed cam 32 engaging the front shoe 16, and carried by or integral with a cam shaft 34 journalled in a bracket or support 36 having a lug 38 at one side of the bearing for the shaft 34, which lug serves as an anchoring abutment engaged by shoe 14 to take the braking torque of both shoes when the drum is turning counter-clockwise in Figure 1,— i. e. when the automobile is moving forward.

Bracket 36 has wings 40 engaging the inner face of plate 12, to prevent the bracket from twisting as the brake is applied, and is mounted on a pivot 42 carried by the backing plate. It is formed with a bearing portion 44 projecting through an opening 46 in the backing plate, which portion engages the side of the opening as in Figure 8 to transmit the braking torque to the backing plate when the car is moving forward. When the car is moving backward, the portion 44 of bracket 36 swings into the center of opening 46, and does not take any torque.

When the car is moving backward, the torque is taken by an eccentric adjustable anchor or abutment 48 secured to the backing plate, and which is engaged by a novel channel-section steady rest 50 secured to shoe 16 by fastenings 52 passing through the double-thickness web of the shoe. Shoe 14 is also provided with a similar steady rest 54, which, however, does not transmit any of the braking torque.

Steady rests 50 and 54 are yieldingly held in engagement with the backing plate by leaf springs 56 arranged, as shown in Figure 3, to engage the drum sides of the shoes.

Shaft 34 is operated to apply the brake by an arm 58, acting against the resistance of a return spring 60. At one side of arm 58, a lever 62 operated by a cable or other tension element 64 is pivoted at 66 on the backing plate. Lever 62 has a part 68 extending around arm 58 and terminating in an integral ball 70 engaging the face of arm 58 opposite the pivot 66.

While one illustrative embodiment has been described in detail, it is not my intention to limit the scope of the invention to that particular embodiment, or otherwise than by the terms of the appended claims.

I claim:

1. A brake comprising, in combination, a drum, a backing plate at the open side of the drum, retarding means within the drum having an operating shaft extending through the backing plate and provided with an arm on the outside of the backing plate, and an operating lever pivoted at one side of the arm and having a part extending around the arm and having its end in thrust engagement with the opposite side of the arm.

2. A brake comprising, in combination, a drum, a plurality of connected floating shoes within the drum, applying means arranged to take the braking torque in one direction of rotation of the drum, and a device separate from and at one side of the applying means and arranged to take the braking torque in the other direction of rotation of the drum.

3. A brake comprising, in combination, a drum, a plurality of connected floating shoes within the drum, applying means arranged to take the braking torque from one of the shoes in one direction of rotation of the drum, and a device separate from the applying means and arranged to take the braking torque from a different shoe in the other direction of rotation of the drum.

4. A brake shoe having a channel-section part secured to its side for engagement with the brake backing plate.

5. A brake shoe having a channel-section part secured to its side for engagement with the brake backing plate, in combination with a stationary abutment engaged by one end of said part and taking the torque of the shoe.

6. A brake shoe comprising stampings secured together and forming a double-thickness stiffening web, a channel-section part having its bottom engaging said web and its sides projecting substantially perpendicular to said web, and fastenings passing through the web and said bottom.

7. A brake shoe comprising stampings secured together and forming a double-thickness stiffening web, and a channel-section part having its bottom engaging said web and its sides projecting substantially perpendicular to said web.

8. A brake comprising, in combination, friction means, applying means therefor, a pivotally-mounted support for the applying means, and a part engaged by the support when it swings at least in one direction and which takes the torque of the friction means through the support.

9. A brake comprising, in combination, friction means, applying means therefor, a backing plate and a support for the applying means pivoted on the backing plate and having a part projecting through an opening in the backing plate and engaging one side of the opening when the support swings at least in one direction in order to transmit to the backing plate the torque of the friction means.

In testimony whereof, I have hereunto signed my name.

LUDGER E. LA BRIE.